United States Patent
Pirilä

(10) Patent No.: US 6,948,267 B2
(45) Date of Patent: Sep. 27, 2005

(54) DEVICE FOR OPTIMIZATION OF THE THICKNESS OF AN ICE LAYER

(75) Inventor: Timo Pirilä, Kalanti as (FI)

(73) Assignee: Kalannin Kaspek Oy, Kalanti as (FI)

( * ) Notice: Subject to any disclaimer, the term of this patent is extended or adjusted under 35 U.S.C. 154(b) by 0 days.

(21) Appl. No.: 10/472,997

(22) PCT Filed: May 2, 2002

(86) PCT No.: PCT/FI02/00371
§ 371 (c)(1),
(2), (4) Date: Apr. 12, 2004

(87) PCT Pub. No.: WO02/093106
PCT Pub. Date: Nov. 21, 2002

(65) Prior Publication Data
US 2004/0187357 A1 Sep. 30, 2004

(30) Foreign Application Priority Data
May 11, 2001 (FI) .......................................... 20010195 U

(51) Int. Cl.[7] .................................................. E02F 3/76
(52) U.S. Cl. ............................ 37/268; 37/271; 37/903; 37/907; 172/4.5; 172/779; 701/50
(58) Field of Search ......................... 172/4, 4.5, 7, 812, 172/818, 445, 449, 774, 780, 799, 413, 417, 448, 451, 484; 701/50; 37/196–200, 214–219, 241, 266–285, 381, 382, 403, 407, 408, 195, 903, 907

(56) References Cited

U.S. PATENT DOCUMENTS

| | | | |
|---|---|---|---|
| 4,273,196 A | 6/1981 | Etsusaki et al. | |
| 4,537,259 A | 8/1985 | Funabashi et al. | |
| 5,375,663 A | 12/1994 | Teach | |
| 5,806,604 A | 9/1998 | Sanders | |
| 5,917,593 A | 6/1999 | Hirano et al. | |
| 6,029,752 A | 2/2000 | Young | |

FOREIGN PATENT DOCUMENTS

| | | |
|---|---|---|
| EP | 0 797 075 A2 | 9/1997 |
| EP | 1 079 029 A2 | 8/2000 |

*Primary Examiner*—Christopher J. Novosad
(74) *Attorney, Agent, or Firm*—Burns, Doane, Swecker & Mathis, LLP

(57) ABSTRACT

An ice resurfacing machine laser control is used to optimize the ice layer on an artificial ice track, such as an ice hockey rink and is adapted for use in ice resurfacing machines. The thickness of an ice layer is optimized with a beam for a laser transmitter. The ice resurfacing machine comprises a laser receiver and mechanisms to regulate the elevation of the scraper blade.

3 Claims, 1 Drawing Sheet

DEVICE FOR OPTIMIZATION OF THE THICKNESS OF AN ICE LAYER

Figure 1:
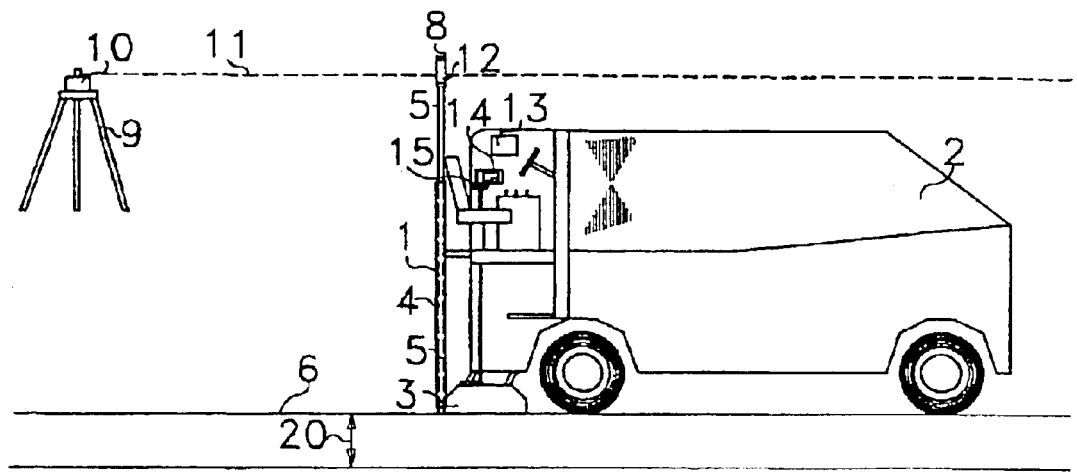

The invention relates to an ice resurfacing machine laser control unit used for optimizing the thickness of the ice layer on an artificial ice field, such as an ice hockey rink, whereby the elevation of the ice resurfacing machine's ice scraper blade is adjusted by controlling the movement of a regulating element, such as the movement of a variable-speed motor.

The number of ice rinks and ice arenas has grown quickly with the popularity of ice hockey. In different countries, the estimated number of ice rinks in which refrigeration machines are used to freeze the ice field is estimated to be 12,000 in total. In addition to these, open artificial ice fields are also used, but these are fewer in number. Nearly all ice rinks use ice resurfacing machines, which are used to maintain, level and re-freeze the surface of the ice. In order to level the surface of the ice, the ice resurfacing machines have a scraper, which removes the worn surface of the ice and levels it. The scraper comprises a blade which can be raised and lowered and which trims off a layer of a desired thickness of the iIce surface. In order to control the elevation of the blade, the resurfacing machines have either a manual elevation adjustment mechanism or a mechanized elevation adjustment mechanism. The leveling of the ice surface has been completely dependent upon the skill of the operator of the ice resurfacing machine. For the leveling run of the machine, the thickness of the ice layer has been measured, for example, by boring a hole into the ice.

Laser control units, transmitters and receivers have been used for very different measuring purposes. Their most common applications can be found in the field of structural engineering, in which laser mechanisms are used to determine a position of elevation. For example, laser measuring mechanisms are used for controlling earth moving machines when making roads or the like. U.S. Pat. Nos. 4,273,196, 5,375,663 and 5,917,593 illustrate a laser control unit installed on a bulldozer, whereby the front bumper plate of the earth moving machine is controlled. Towed earth moving machines use the laser control units illustrated in U.S. Pat. Nos. 5,806,604 and 6,029,752. The use of laser measuring mechanisms in structural engineering of housing has also become common.

The purpose of the invention is to provide a device for optimizing the thickness of an ice layer, whereby the surface of the ice is always levelled with the precision of a few millimeters as the worn ice is being removed. When using a device according to the invention, there is no need to measure the thickness of the ice layer or to carry out different ice-leveling runs.

With the invention, variations in the thickness of the ice can be controlled within an optimal margin of 15–25 millimeters. The accuracy of a laser control unit serves the purpose excellently. The ice thickness in ice rinks varies significantly from one rink to another, within 15–80 millimeters. Ice maintenance has great significance on the variations in the ice thickness. The utilization rate of an ice rink is generally nearly 100% and there is only time to level the ice at night, thus costs are great. About 2–3 working hours a week are used to level the ice.

Ice is known to be a fair insulant. For this reason, the thickness of the ice has significant implications for the energy expenditure of refrigeration machines. Measurements which have been carried out have verified that the energy used for a 10-millimeter ice layer, over a working period of 8 months, is 6 MWh per year. An additional 50-millimeter ice layer increases the electricity bill by about 30 MWh, which is equivalent to the amount of energy used annually by two electrically heated homes.

The previous disadvantages are eliminated and the previously defined objectives are accomplished with a device for optimizing the thickness of an ice layer according to the invention, the characteristics of which are defined in the characteristics section of the claims.

The most important advantage of the invention is the savings attained in maintenance costs and energy when it is used. The time it takes for a device for optimizing the thickness of an ice layer according to the invention to compensate for its own cost is less than one working season. Other advantages include a level surface of ice and extended ice time as a result of a reduction in maintenance work. A reduction in energy consumption is also always an environmentally friendly solution. Additionally, the invention will facilitate the work of the ice maintenance personnel. The thickness of the ice affects the quality of the ice. Irregular freezing caused by deviations from the optimum level of ice thickness is avoided and the ice field freezes evenly in connection with its maintenance.

Next, the invention will be described in detail with reference to the accompanying figures.

FIG. 1 diagrammatically illustrates a side view of the laser control unit and laser transmitter of a device for optimizing the thickness of an ice layer, which have been mounted on an ice resurfacing machine.

Figure 2:
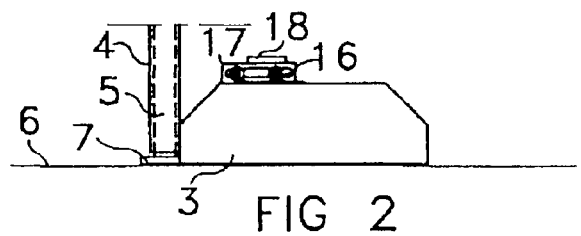

FIG. 2 diagrammatically illustrates an enlarged side view of the lower part of the invention according to FIG. 1.

Figure 3:
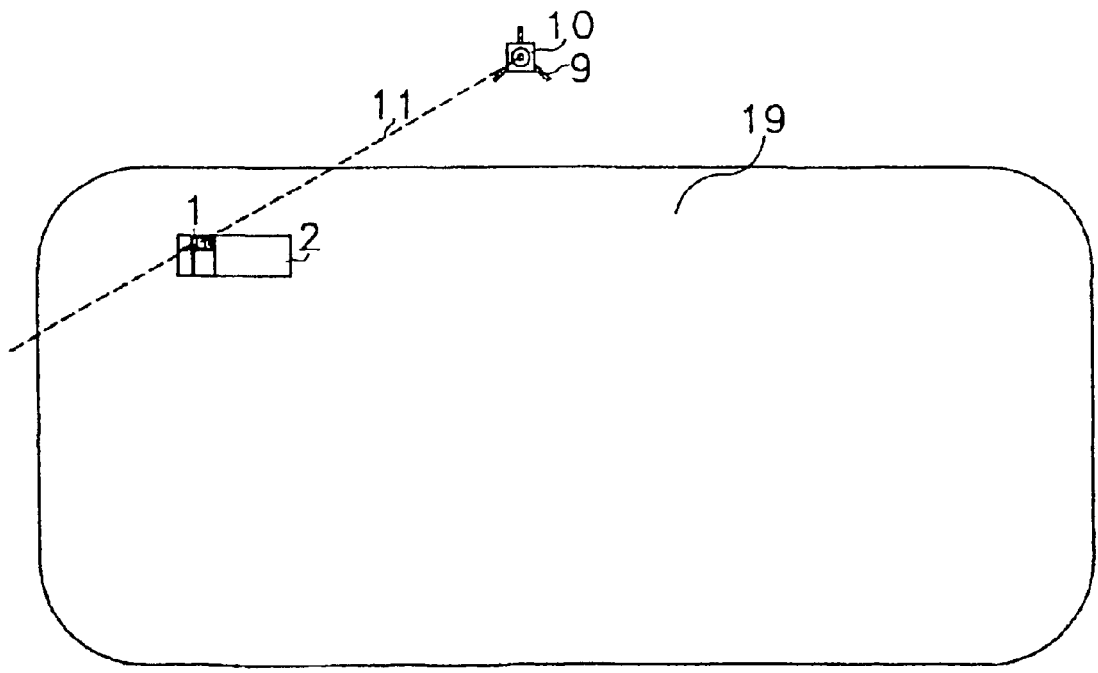

FIG. 3 diagrammatically illustrates a top view of the laser control unit and the laser transmitter of a device for optimizing the thickness of an ice layer according to the invention.

An ice resurfacing machine laser control unit 1 according to the invention is mounted advantageously to the back part of an ice resurfacing machine 2 as close to the ice scraper 3 as possible, to its center section. In the method of implementation of the invention illustrated in FIGS. 1–2, the tubular frame part 4 of the ice resurfacing machine laser control unit is mounted from its lower section to the cover of the ice scraper 3 and from its center section to the body of the ice resurfacing machine 2. A free-sliding measuring rod 5 has been fit vertically inside the upright tubular frame part 4, at the bottom end of which measuring rod, a runner 7, pressing on the ice surface 6 and reducing the surface pressure, measures the elevation of the ice surface 6.

The laser receiver 8 of the control unit 1 of the ice machine is mounted on the top end of the measuring rod 5, which extends above the top of the ice resurfacing machine 2. A laser transmitter 10, mounted on a tripod support 9, or the like, sends a laser beam 11, for example revolving or planar, the elevation of which is read with the scale 12 of the laser receiver 8. A signal which deviates from the measuring scale 12 of the laser receiver 8 is conducted to the central unit 13, which controls a variable-speed motor 14, or corresponding operating device which regulates the elevation of the ice scraper 3 blade. A method of implementation of the invention in accordance with FIG. 1 includes a variable-speed motor 14, which has been equipped with a herringbone gear and which rotates the manually operated adjusting wheel 15 of the ice scraper blade 3.

The extreme positions of the ice scraper 3 blade of the ice resurfacing machine 2 can be determined using sensors 16 and 17. Electric eyes, or the like, which function as sensors 16, 17, are mounted on the cover of the ice scraper 3 for manual adjustment. The slide piece 18 moves on a horizontal plane, the elevation of the ice scraper 3 blade changing. The minimal value of the blades removes the layer of worn ice and the maximum values of the blades level the surface of the ice 6. The maximum blade value prevents the removal of a too thick ice layer. This way, the ice machine 2 accomplishes the work done in several leveling runs.

The laser control unit 1 of an ice resurfacing machine according to the invention is used in the following way, for example, for carrying out maintenance work on ice hockey rink 19. The support 9 of the laser transmitter 10 is placed outside the borders of the ice hockey rink 19, such that the elevation of the beam 11 transmitted by the laser transmitter 10 corresponds to the elevation of the laser receiver 8 on the ice resurfacing machine 2. The support 9 is adjusted, such that the distance of the laser beam 11 from the bedplate of the ice hockey rink 19 is the same everywhere. In other words, the laser beam 11 is aligned parallel to the bedplate. The laser receiver 8 is mounted at the correct elevation on the end of the measuring rod 5 by considering the thickness of the ice layer and the deviation from optimal thickness. The thickness of the ice layer underneath the runners of the measuring rod 5 is determined, for example, by drilling a hole and then by setting the laser receiver 8 at the right elevation.

An ice resurfacing machine 2 equipped with a laser control unit 1 is used in maintenance work in the normal way and separate runs for leveling the ice surface 6 are not necessary, because correction of the ice surface 6 occurs as a continuous process. Once adjustments are set on the laser control unit 1 of the ice resurfacing machine, they do not need to be changed, provided that the ice resurfacing machine is used on the same ice field 19. Because the ice scraper 3 of the ice resurfacing machine 2 cannot reach very close to the borders of the ice field 19, border ice is generally thinned with hand implements.

It is apparent to the professionals of the field that the invention is not limited exclusively to the example described above, but that it can vary within the frames of the claims presented below. A device for optimizing an ice layer according to the invention can be adapted to an ice resurfacing machine, for example, such that the laser receiver 8 is located in a different place.

What is claimed is:

1. A system for performing maintenance of an ice surface of an ice hockey rink comprising:

an ice resurfacing machine movable across the ice surface and comprising a scraper blade which scrapes the ice surface;

a laser transmitter which transmits a laser beam;

and a laser control unit mounted on the ice resurfacing machine, the laser control unit comprising a laser receiver which receives the laser beam transmitted by the laser transmitter and an elongated member operatively associated with the laser receiver and mounted on the ice resurfacing machine in a freely movable manner, the elongated member having a lower end adapted to rest on the ice surface as the ice resurfacing machine move across the ice, the laser control unit being operatively connected to the scraper blade to adjust an elevation of the scraper blade.

2. A system according to claim 1, wherein the freely movable elongated member is a freely movable measuring rod, and the laser receiver is mounted on the measuring rod.

3. A system according to claim 1, wherein the laser receiver is mounted on th elongated member and moves together with the elongated member.

* * * * *